United States Patent [19]
Van Dyck et al.

[11] 3,929,545
[45] Dec. 30, 1975

[54] PRESSURE LAMINATING METHOD

[75] Inventors: Emil J. Van Dyck; Jerry L. Malina; Raymond E. Schiller, all of Temple, Tex.

[73] Assignee: Dart Industries Inc., Los Angeles, Calif.

[22] Filed: May 23, 1974

[21] Appl. No.: 472,567

Related U.S. Application Data

[63] Continuation of Ser. No. 268,259, July 3, 1972, abandoned, which is a continuation-in-part of Ser. No. 170,076, Aug. 9, 1971, abandoned.

[52] U.S. Cl. ................ 156/220; 156/230; 156/247; 156/272; 156/323; 428/156; 428/914
[51] Int. Cl.² ..................... B32B 31/12; B32B 31/20
[58] Field of Search .......... 156/272, 185, 230, 231, 156/241, 249, 219, 323, 313, 278, 239, 235, 240, 71, 247, 289, 220; 161/116, 165, 247, 406 T, 413; 117/65.2; 428/345, 914, 156; 427/35, 54

[56] References Cited

UNITED STATES PATENTS

| | | | |
|---|---|---|---|
| 3,049,458 | 8/1962 | Willard | 156/278 |
| 3,551,241 | 12/1970 | Heeb et al. | 156/230 |
| 3,616,028 | 10/1971 | Miller et al. | 156/272 |
| 3,658,620 | 4/1972 | Hall | 156/272 |
| 3,661,672 | 5/1972 | McQuade, Jr. | 156/323 X |
| 3,677,876 | 7/1972 | Oliver | 156/323 X |
| 3,713,935 | 1/1973 | Grecchi | 156/272 X |

*Primary Examiner*—William A. Powell
*Assistant Examiner*—M. G. Wityshyn
*Attorney, Agent, or Firm*—Kenneth J. Hovet; Leigh B. Taylor; Paul R. Wylie

[57] ABSTRACT

A method for making a decorative pressure laminated article wherein a texturing sheet or a decorative sheet may be used as a carrier for the surface coating resin during manufacture. A novel product is also provided having a relatively heavy polyester or acrylic resin coating.

8 Claims, 7 Drawing Figures

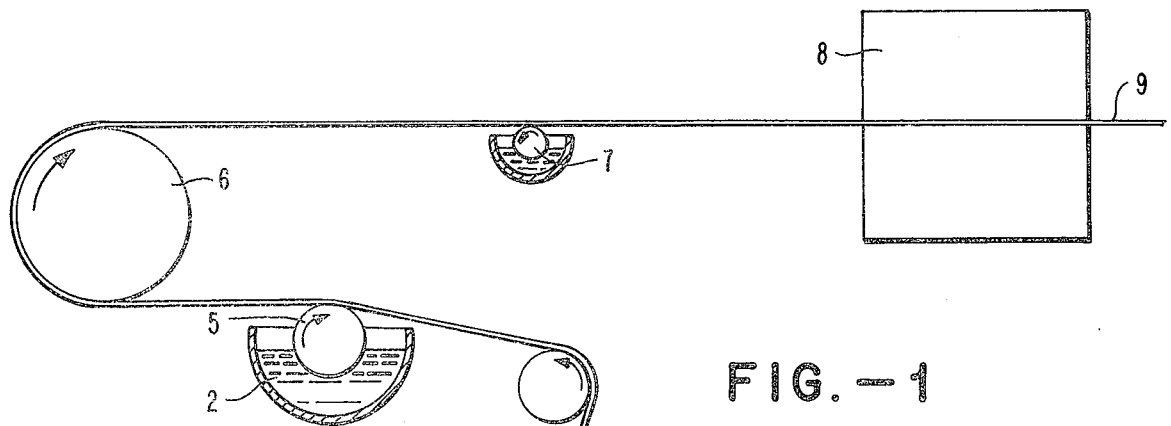
FIG.—1
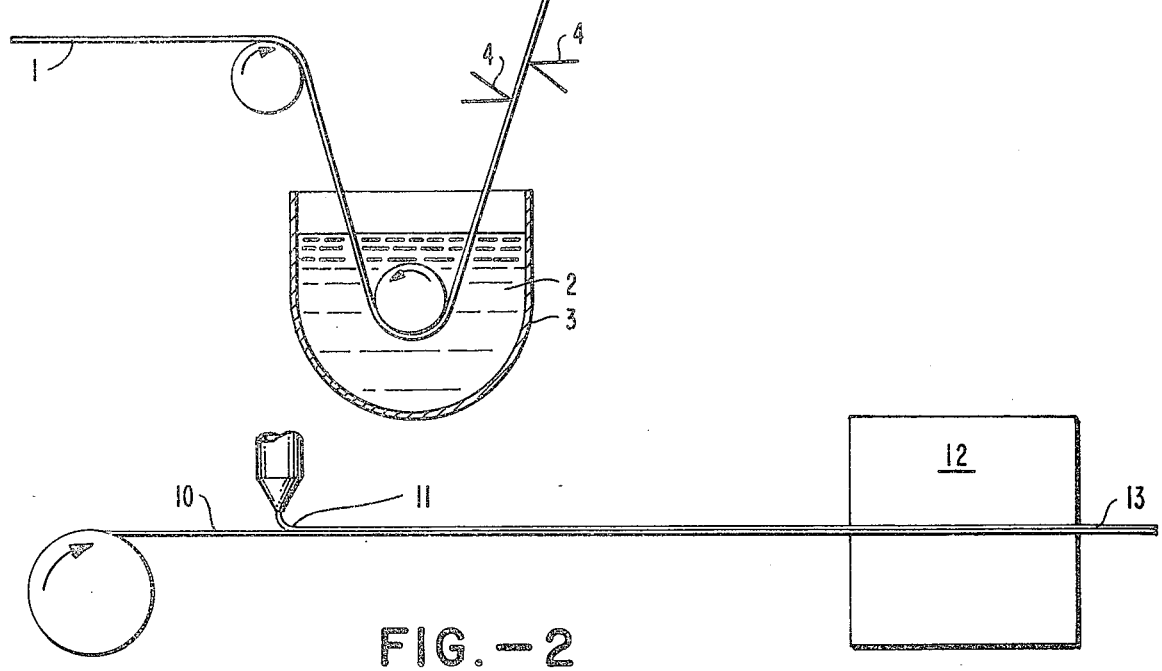
FIG.—2
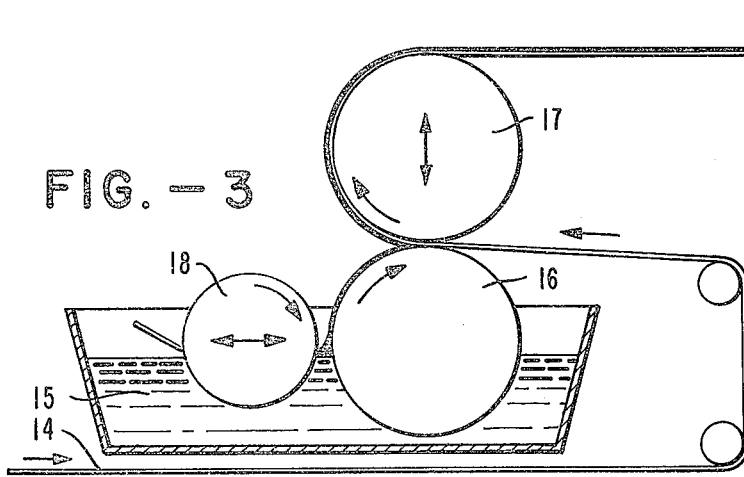
FIG.—3
INVENTORS
EMIL J. VAN DYCK
JERRY L. MALINA
RAYMOND E. SCHILLER
BY Paul R. Wylie
ATTORNEY

PRESSURE LAMINATING METHOD

CROSS-REFERENCES TO RELATED APPLICATIONS

This is a continuation of application Ser. No. 268,159 filed July 3, 1972, now abandoned, which is a Continuation-in-Part of patent application Ser. No. 170,076 filed Aug. 9, 1971, now abandoned.

BACKGROUND OF THE INVENTION

1. Field of the Invention

This invention generally relates to pressure laminated articles and methods of preparing them. More specifically, it relates to these articles and methods which pertain to decorative laminates utilizing thermosetting resins for walls, counter tops, furniture and areas where a durable decorative surface is required.

2. Description of Prior Art

Conventional decorative plastic laminated products of the type that are intended for use as tops for tables, bars, counters and the like are formed by a "high pressure" process, so-called because relatively high pressures in the range of about 800 psi to about 1400 psi are used to press the various layers together during manufacture. These commercial laminates are usually formed from a number of phenolic resin impregnated paper layers as a base substrate over which decorative resin impregnated sheets of a cellulose paper are placed. The decorative paper may be printed with a wood grain, for example. A surface layer of melamine resin impregnated cellulosic material is placed on top of the decorative sheet, and the various layers are sandwiched in a press for forming into a laminate.

The conventional high pressure process for laminates requires heavy duty equipment for pressing at the required pressures and requires a relatively long cycle time. It has therefore been the goal of producers of these laminates to attempt to find methods and materials which will result in a lower pressure laminating process while at the same time producing a decorative laminated product that will be as attractive and durable as its high pressure counterpart.

A prior approach to the production of low pressure laminates has been to provide an impregnated and coated decorative paper sheet which can be bonded with pressure and heat cemented to a structural substrate. This method involves the impregnation of the decorative paper in a resin solution containing polymer, monomer catalyst and an organic solvent for such. One of the disadvantages with this process is that it has been difficult to obtain a high quantity of resin (e.g., greater than 65 percent) which is necessary to provide a surface coating such that the resulting laminated product will be sufficiently durable for its customary uses. Another disadvantage is the migration of the surface resin through the paper into the substrate during the bonding operation under heat and pressure, resulting in a too thin surface layer of resin and concomitant decrease in durability.

A superficially similar prior art process to that of the present invention is disclosed in U.S. Pat. No. 3,551,241. However, in that process solvents must be driven off thereby creating a pollution hazard which is increased proportionately with the resin content of the decorative sheet.

SUMMARY OF THE INVENTION

This invention has solved the noted prior art problems, and in so doing had among its objects the provision of a laminating process and coating technique which would have a minimum of associated pollution problems and produce a product that had a maximum of durability and usefulness. It was a further object of the invention to provide a process that could be used in either low or high pressure operations and would be economical and flexible in the type of products it could produce, taking into consideration the requirements of inventory supply and capital expenditure coupled with geographical restrictions on the supply of raw materials and the economics of bulk shipment of goods.

According to one aspect of the invention, there is provided a method of manufacturing a laminated product including, as first steps, the producing of a substantially dimensionally stable semisolid resin film of substantially 100 percent reactive solids on a textured sheet-like media (sometimes hereinafter referred to as a "texturing sheet") and the producing of a decorative substrate material for said laminated product. The resin film is then superimposed upon and laminated to the decorative substrate which is superimposed upon and laminated to a core material in a single pressing operation under conditions of heat and high or low pressure such that the film, the decorative substrate and the core material are bonded together. The textured media is then removed from the resin film leaving a laminated product having a desired coating of resin having an appropriately textured surface.

In accordance with another aspect of the invention, a process is provided comprising the steps of coating a decorative substrate with a liquid resin film having substantially 100 percent reactive solids, curing said resin to a substantially dimensionally stable semisolid state, and impressing a texturizing media upon said resin. The process is preferably carried out on a continuous basis whereby the texturing media is sheet-like and is bonded to the resin-coated decorative paper by the use of pressure belts or roller means. The resultant intermediate product can be formed into rolls for storage or cut to size on the production line for subsequent bonding to a substrate and removal of the texturing media as set forth herinbelow. The above-described process has the advantage of versatility, economy and simplicity of use plus the further advantage that it reduces labor costs by reducing the number of sheets that are arranged upon a substrate core for hot pressing into a final laminated product.

It should be understood that in the above-described continuous process, the decorative material is interchangeable with the texturing media such that the texturing media is coated with a liquid resin and the decorative sheet-like material is then bonded to the resin coating.

Another feature of the invention is the provision of antipollution techniques for producing the intermediate product embodied in a partially cured semisolid resin film on a textured sheet-like media. A further feature of the invention is the technique for decreasing the flowability of a liquid resin film to a semisolid state on the textured media so that an intermediate product for the manufacture of decorative laminates will be provided that is capable of being handled, shipped to remote locations, and stored for long periods of time.

One of the important advantages of the invention is that the thickness of the resin layer on the final laminated products can be easily controlled by producing textured sheet-like media having semisolid resin layers of various thicknesses. For example, if a rather light duty product is desired, a resin layer of only about 0.003 ins. can be applied to the textured sheet-like media. If a heavy duty product is desired, a resin layer of 0.010 to 0.012 ins. can be applied. Inasmuch as the decrease of flowability of a liquid resin to form a semisolid resin layer is easily accomplished, particularly by the preferred partial curing step of this invention, it is entirely feasible to mass produce the decorative substrate material preimpregnated with resin according to the invention and then, on a custom basis, produce the desired resin thickness on the textured sheet-like media for the ultimate product. As a practical matter, this means that a single plant operating under fixed conditions can mass produce the resin impregnated decorative sheet and the resin coated textured sheets. Remote or satellite plants located at geographically removed locations can produce the final laminated product with the desired coating thickness depending upon ultimate usage.

An equally important advantage of this invention is that in addition to obtaining a semisolid resin film, the greatest portion of the resin shrinkage takes place during the B staging and results therefore in a more warp free laminate.

BRIEF DESCRIPTION OF THE DRAWINGS

The invention will be more fully understood with reference to the accompanying drawings wherein:

FIG. 1 shows schematically a method of producing a decorative substrate material of the type that will be used in the formation of a final laminated product according to the various aspects of the invention;

FIGS. 2 and 3 show schematically alternate methods, according to the invention, of producing a substantially dimensionally stable resin film on a textured sheet-like media;

DETAILED DESCRIPTION OF THE INVENTION

Figure 3A:
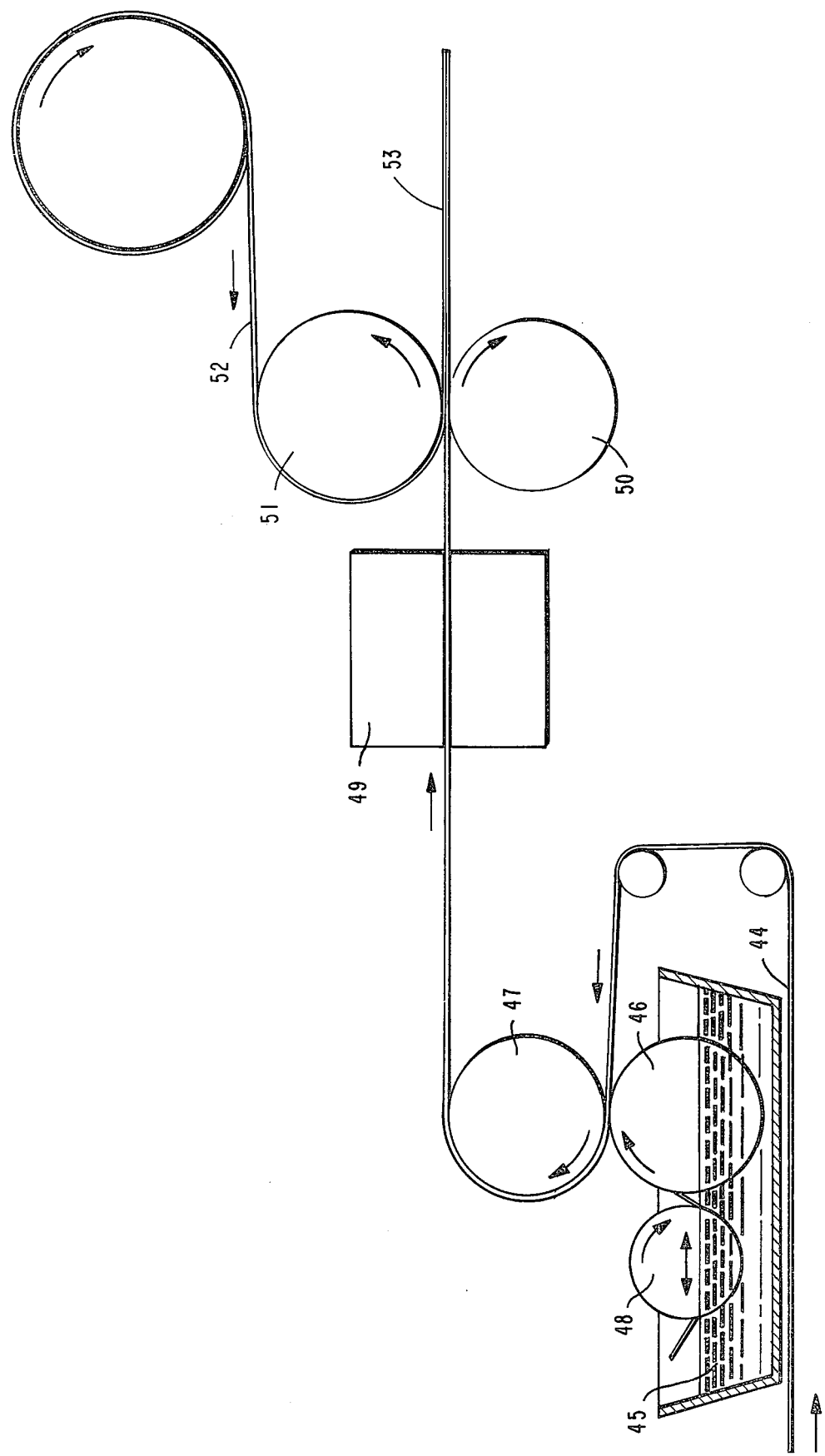
FIG. 3a is a schematic sectional view of a method for producing an intermediate laminar product that is subsequently cut and laminated to a substrate material to form a final laminated product.

Referring now to the drawings and particularly to FIG. 1, a decorative substrate sheet 1 is contacted with a liquid thermosetting resin 2 in vat 3. The excess resin is removed from the substrate sheet by wipers 4. If desired, an additional coat of liquid resin 2 can be applied by roller 5 which is commonly called a "kiss" coating application. The direction of the substrate sheet can then be reversed by roller 6 and a second kiss coating application may be performed by roller 7 to apply liquid resin to the reverse side of the sheet. The resin impregnated sheet is then dried in oven 8 to form the resin impregnated substrate material 9 used in the invention.

Referring now to FIG. 2, a texturing sheet 10 has applied to its upper surface a flowable thermosetting resin 11. The flowability of said resin is then decreased to a dimensionally stable semisolid state by treatment in accordance with the invention as shown, for example, in unit 12 which might be an ultraviolet or electron beam curing unit, as will be further described, to produce an intermediate product 13.

FIG. 3 depicts an alternate method to that shown in FIG. 2 for applying liquid resin to a texturing sheet. As illustrated, a texturing media 14 has applied to its upper surface a flowable resin 15 by means of rolls 16 and 17 which form what is commonly known as a reverse roll coater. The thickness of the resin layer is metered accurately by the gap formed between adjustable roller 18 and roll 16. The flowability of the resin thus applied is then decreased to a dimensionally stable semisolid state by treatment in accordance with the invention as shown, for example, in unit 19 which might be an ultraviolet or electron beam curing unit, as will be further described to produce an intermediate product 20. The texturing sheet with the semisolid resin layer made by the foregoing methods can then be rolled and stored for further use.

Figure 4:
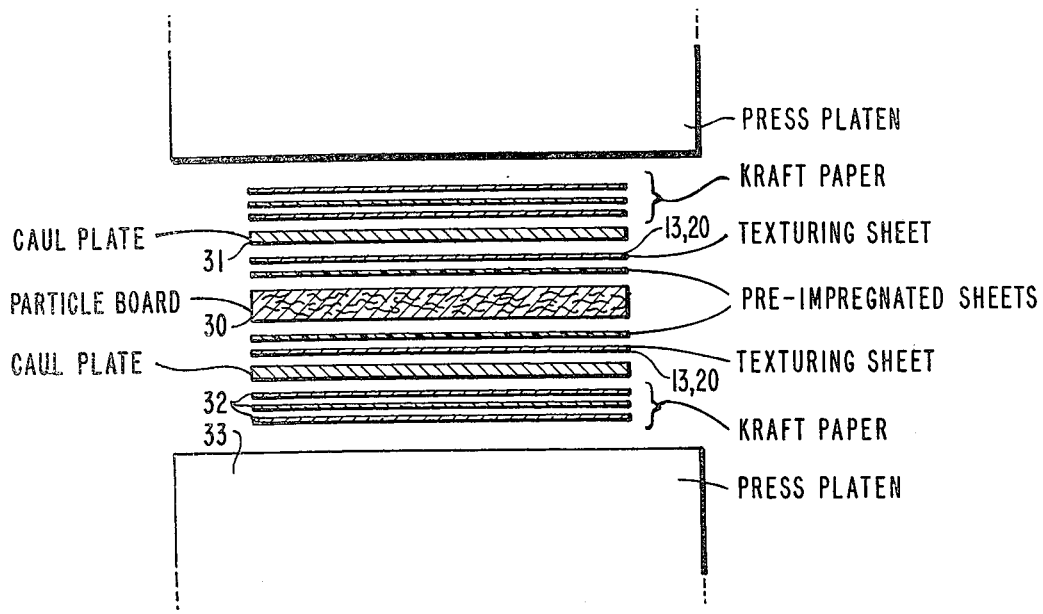
FIG. 4 shows the various strata of the laminated product according to the invention prior to being pressed together under temperature and heat and includes depictions of several layers of material that do not form the final product but are used for processing.

After the resin impregnated substrate and the texturing sheet with the resin layer are formed, they can be stored as desired, transported, and then cut into sheets of the desired size for the final pressing operation. In preparation for the final pressing step, the various sheets are arranged as shown in FIG. 4 with particle board 30 forming the inner structural layer, preimpregnated decorative substrate sheets 9 being placed next to the particle board and texturing sheets with a resin layer 13 or 20 being placed over the preimpregnated substrate sheets. Aluminum caul plates 31 are placed on top of the texturing sheets and several sheets of kraft paper 32 are used between press platens 33 to equalize the pressure applied to the laminate. The final laminated product is shown in FIG. 5 and comprises particle board 30 to which are bonded preimpregnated decorative substrate sheets 9 and a resin layer 34 which was transferred from the texturing sheet in the press.

Figure 5:
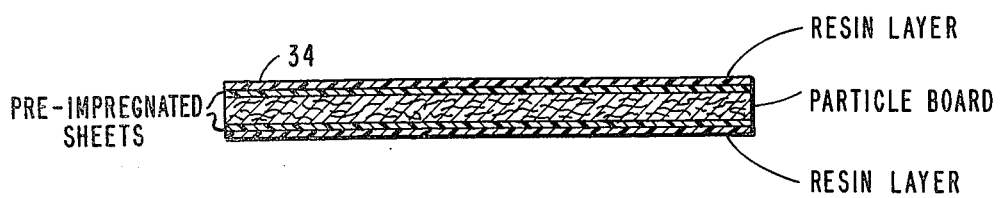
FIG. 5 shows a final laminated structure produced according to the invention; and, FIG. 6 shows an alternate form of the final product according to the invention.
Figure 6:

Alternatively to the product shown in FIG. 5, a veneer-like product can be formed according to the invention by using instead of particle board a series of core substrate sheets to provide such a product of the desired thickness. A product of this type is illustrated in FIG. 6 wherein substrate sheets topped by a preimpregnated sheet and a resin layer comprise a final laminated product.

It will be understood that whereas a product is shown in FIG. 5 having layers of resin on both sides, it is not necessary to form layers on both sides and a product having a resin layer on only one side can be produced.

In one preferred embodiment, the substrate material is contacted with an unsaturated polyester resin of a type commonly known as an isophthalic resin. These resins are curable, and the resin, as applied, therefore typically includes polymer, monomer, catalyst and an organic solvent. The monomer can preferably be a vinyl monomer such as diallyl phthalate, styrene, or diacetone acrylamide. Of these, diacetone acrylamide is preferred because it is available in a solid form and results in a substrate material that is not as tacky as those obtained with a liquid monomer. Moreover, the solid monomer material, when present in the substrate, will not evaporate as readily as liquid monomer and therefore results in a substrate material that can be stored for long periods of time without harmful changes in its properties.

It is also preferred to use a resin solution for impregnating the substrate of the foregoing type having from about 45 to 55 percent reactive materials when both solid polymer and monomer are used. The solvents used can be any suitable solvent for the solid materials including methyl ethyl ketone, acetone, water, or methylene chloride.

It is advantageous to use a polymer/monomer ratio in the substrate impregnating resin such that the resulting melt viscosity of the resin at the time of cure will not be unduly low. Extremely low melt viscosities are undesirable inasmuch as too great a resin flow will result and the resin will have a tendency to extrude out from between the various layers of the laminable product or migrate through the core material during the pressing operation.

After impregnation of the decorative substrate with the resin, the solvent is driven off at a temperature below the basic curing temperature of the resin system, and a decorative substrate product results which can be rolled, with an interleaver if necessary, and stored for long periods up to about one year.

An important feature of this invention is the provision of a method of applying the final resin film to the surface of the laminated product. This method involves basically the steps of applying a flowable thermosetting resin on a textured sheet-like media, decreasing the flowability of said resin on the media to a semisolid state such that the resin film thus formed will remain substantially dimensionally stable during subsequent handling and storage operations. Even though the resin film has its flowability decreased so that a substantially dimensionally stable resin film will be obtained, it is nevertheless important that the film produced be somewhat less than completely cured. This is significant inasmuch as the uncured resin, when finally applied to a resin impregnated decorative substrate, will have the ability to chemically bond with the resin of the substrate to form a continuous cured resin system throughout the final laminated product.

An equally important feature of the present invention involves the method depicted in FIG. 3a. As illustrated, a pre-impregnated decorative substrate material 44 is coated with a flowable resin 45 as it moves between rollers 46 and 47. The thickness of the resin layer is regulated by the gap formed between adjustable roller 48 and roll 46. The resin is then partially cured to a dimensionally stable semisolid state by treatment in unit 49 which can be an ultraviolet or electron beam curing unit. The decorative substrate with its semisolid resin layer continues moving between pressure rollers 50 and 51 which also serves to apply a texturizing sheet 52 upon the semisolid resin film. Generally, a pressure of 5 to 150 pounds per lineal inch between the rollers 50 and 51 serves to bond the texturizing sheet to the semisolid partially cured resin film. The particular pressure depends upon the type and configuration of texturizing being sought, the type of resin used, and the extent of curing and/or surface hardness of the resin film — keeping in mind that the texturizing media is removed after final pressing. The intermediate laminated product 53 may be formed into continuous rolls or cut into predetermined lengths for convenience of storage and/or shipment.

It is to be understood that the impregnated decorative substrate material 9 of FIG. 1 may be utilized in place of the material 44 shown in FIG. 3a. It should also be noted that material 44 may be an acrylic or vinyl latex saturated base paper which is compatible with the resin 45. In such a case, the resin 45 would contain a material having ultraviolet sensitized vinyl linkages.

It should be noted that the texturizing sheet 52 may be used at the beginning of the process in place of the material 44 and the material 44 would then be used between the pressure rollers 50 and 51 in place of the texturizing sheet. The resulting intermediate product 53 would be the same in either case.

The flowability of a liquid resin system can be decreased by the techniques of this invention so that various advantages can be obtained in the selection of resin materials. For example, flowability of the resin can be decreased by treatment of a liquid resin film with either ultraviolet or electron beam radiation. With either of these systems, a liquid resin having 100 percent reactive solids (no non-reactive solvents) can be utilized, thus avoiding pollution hazards that are present when solvents are used in a resin system which must be driven off to the atmosphere. Thus, if either ultraviolet or electron beam methods as described below are used, a resin consisting essentially of a polyester resin of the isophthalic type and a vinyl monomer, preferably styrene, can be used. Appropriate catalysts which are well known in the art can also be used. Resins known in the art as acrylic resins, acrylic polymer blends, including such materials as styrene, acrylate and/or methacrylic esters, acrylic-urethane mixtures or other polyacrylic acid resin systems can be used in the process and products of the invention.

Examples of acrylic polymer mixtures which may be used with the present invention are those shown in U.S. Pat. Nos. 3,530,100 and 3,437,514 which are hereby incorporated by reference. It is to be understood that the particular resin composition utilized is a matter of choice depending on the end product desired and does not form a part of this invention. It is, however, important to the present invention to provide resin films which are chemically compatible with each other so that proper laminations may be effected to produce durable decorative products.

The flowable resin film is applied to a continuously moving textured sheet-like media or impregnated decorative sheet and then subjected to operations to decrease its flowability. The resin can be applied so that a substantially constant thickness is present on the sheet by metering equipment such as reverse roll coaters or a curtain coater or the like. Because of the requirement for an accurate thickness of the resin on the media, it is preferred to use a reverse roll coater because of its accuracy in applying sometimes desirable thick films in the invention. The film thickness before the flowability is decreased can be from about 0.001 ins. to about 0.025 ins., and importantly, the thickness can be varied depending upon the amount of resin desired for the particular end use of the laminated product.

In the preferred method according to the invention, the resin film thus applied has its flowability decreased by contact with ultraviolet radiation. This method is preferred because it is not only a rapid inexpensive way in which to decrease flowability, but also because the cure is uniform throughout the resin film; and, the resin after ultraviolet contact has a lack of surface tackiness which results in ease of handling and enables the texturing media and film or the intermediate product comprising the texturing media, film, and decorative sheet, to be rolled without the necessity of an interleaver sheet. It is preferred to contact the resin film with ultraviolet light substantially immediately after the resin film is applied to the textured media. However, the speed of the moving sheet, spacing of the ultraviolet source, resin thickness, and intensity of the ultraviolet source are all interdependent and controllable according to the equipment and other conditions depending upon the end product desired.

The advantages of the invention with respect to pollution problems can also be obtained with radiation curing of the resin on the texturing media. Thus, in an alternate method according to the invention, an electron beam source can be used to subject substantially completely reactive polyester resins and vinyl monomer or acrylic polymer mixtures to gamma radiation under suitable conditions to decrease the flowability of the resin.

It is important that the resin film be less than completely cured for the reasons stated above. The intermediate product produced according to the preceding steps which comprises a substantially dimensionally stable resin film on a textured media wherein the resin is less than completely cured, has particular advantages. It has been found that such a product can be stored for at least about 6 months at temperatures not in excess of about 75°F and it is expected that under certain conditions it could be stored for 1 year or more. This allows ample time for shipment to remote locations where a final laminated product containing a suitable core such as particle board or other structural core substances which, due to their bulk and weight, can only be economically fabricated into decorative laminated products in the vicinity of their manufacture. Thus, the foregoing method and the product made by the method produce substantial advantages in the decorative laminate industry.

The resin film formed on the textured media can be transferred to the decorative substrate by first positioning the film in contact with the substrate which normally will be superimposed on a core material. Then, under heat and pressure such that the resin will be substantially completely cured, the resin film decorative substrate material and core material are bonded together. The textured sheet-like media is subsequently removed leaving a decorative laminate having a desired texture resin film coating.

The final decorative laminate can also be produced with the intermediate laminated product described in relation to FIG. 3a. With such a product, it is not necessary to position a decorative substrate upon a core material and then position a resin coated textured media upon the decorative substrate as described above. All that is involved is the positioning of one sheet, the intermediate laminar product, upon a core material with its decorative substrate side in contact with the core material. The intermediate product and core material are then pressed together, preferably with the aid of kraft paper, in the same manner and under the same range of conditions as that described in relation to FIG. 4. The final products produced are those shown and described in relation to FIGS. 5 and 6.

The final decorative laminate can be produced in the form of structural panels consisting of core materials such as flake board, wood, plywood, etc., by utilizing such in the final pressing operation. Bonding will occur between the core material and the decorative substrate by resin flow from the latter.

The final laminated product comprises a decorative sheet material and a thermosetting resin being impregnated in and coated on said decorative sheet and having a textured upper surface. The resin coating on top of the decorative sheet can have a mean thickness of at least about 0.005 ins. resulting in a total resin content of at least about 65 percent by weight of the combined decorative sheet and resin including the resin impregnated in the decorative sheet as well as that forming the top resin coating. A highly advantageous product of this type according to the invention has a resin coating with a mean thickness of at least about 0.010 ins. with said resin being at least about 78 percent by weight of the combined decorative sheet and resin. An excellent heavy duty product according to the invention has a resin coating with a mean thickness of at least about 0.015 ins. with the resin being present in an amount at least about 80 percent by weight of the combined decorative sheet and resin.

If the final product consists of a core material of the foregoing type, the pressure of the final pressing step may be limited by the pressure which the substrate can withstand. For example, if an industrial grade particle board having a density of about 45 pounds per cu-ft is used, a pressure of up to 250 psi at a temperature of about 300°F can advantageously be used. Such conditions applied for a period of about 6 minutes will result in a structurally sound product with no damage or crushing of the particle board. If higher density flake boards are used, a higher pressure can be used. For example, if a flake board having a density as high as 65 pounds per cu-ft is used, a pressure as high as 500 psi can be utilized. Thus, inasmuch as the pressures which can be utilized may be somewhat limited, it is highly advantageous to have a resin and coating system, as provided by the present system, which can be suitably cured at low pressures.

Alternatively, to the foregoing final laminate which includes a relatively bulky core material, the final product can be a pressure laminated veneer of approximately 0.020 ins. thickness which consists of one or two layers of resin impregnated kraft paper, the decorative substrate and the resin film layer. This product can have a thickness in the range of about 0.015 ins. to about 0.025 ins. and perferably in the range of about 0.018 to about 0.022 ins. This product can then be applied directly to structural surfaces such as, for example, a counter top, by simply using a suitable contact cement or adhesive. Final pressing temperatures in the range of about 275°F to about 360°F and pressures in the range of about 75 psi to about 1200 psi can be used, with pressures in the range of about 200 psi to about 800 psi being preferred. If kraft paper backing is used, it is preferred to use such containing about 25 percent to 50 percent and preferably 30 percent to 35 percent by weight of a resin compatible with the resin of the decorative substrate sheet. Because high pressures will tend to consolidate and drive the resin into the other materials, a lower resin content can be used in the starting strata because of the resulting increased density. For the purpose of consolidation and obtaining a more dense final product, pressures in the range of about 200 psi to about 1000 psi have been found advantageous.

Although the textured sheet-like media can be removed from the final laminated product at any time after the removal of the product from the press, it may be advantageous to leave the texturing media on the product as a protective covering until its ultimate utilization.

The textured sheet-like media used in the invention is preferably a sheet of material that will provide the desired texture to the upper surface of the final laminated product. It is currently preferred to use for example, a relief-coated textured paper to give a so-called "velvet" finish to the surface of the laminate. Embossed papers can also be used to give surfaces having a texture similar to that of slate, natural stone, leathers or other coarsely textured surfaces. The texturing sheets can be treated with a release agent and such release agents can be applied to the texturing sheet either before or after embossing, depending upon the materials used. In the case of metallic texturing sheets, a release agent can be used in the resin applied to the sheet, rather than on the sheet itself. Such release agents can preferably include various stearates such as zinc or calcium stearate.

It is preferred to incorporate an initiator into the composition of the resin applied to the texturing sheet-like media. While it is possible to cure the resin without such initiator, it is nevertheless desirable to include such according to this invention due to the enhanced response of the resin to either ultraviolet or electron beam sources.

It is preferred to use with the ultraviolet curing technique of the invention a catalyst or photopolymerization initiator mixed with the resin system in amounts sufficient so that the resin will cure readily when contacted by ultraviolet light. Typical of such a catalyst that can be used with polyester resin systems is "Norox" sunlight catalyst available from the Norac Company, Inc., 405 South Motor Avenue, Azusa, Calif. The initiator can be present in varying amounts. However, it is preferred to use a photopolymerization initiator in the amount of about 0.5 percent to about 3 percent of the weight of the resin system. It is frequently desirable to use a thermosetting catalyst such as tertiary butyl perbenzoate in the resin mixtures. A concentration of 0.2–1.5 percent by weight of the resin is usually adequate. The following specific examples serve to further illustrate the invention.

EXAMPLE 1

An isophthalic polyester resin system containing 65 percent polyester resin and 35 percent styrene monomer and having a viscosity of 3500 centipoises and a specific gravity of 1.13 was mixed with 1½ percent of "NOROX" sunlight catalyst. The mixture was then formed as a film having a thickness of 3 to 5 mils on an aluminum texturing sheet. The sheet-like media and the resin film were then passed under a 3000 watt ultraviolet bulb operating at 1500 volts. The bulb used was a General Electric UA-27 "uviarc" lamp having a 48 in. lighted length and operated at an output of about 15 amps. The distance of the film from the lamp was about 6 ins. and the film was passed under the lamp at a speed of about 8½ fpm. The resulting resin layer was semisolid having a dimensional stability and only a slight surface tack. The resin layer and the textured media were then placed in a press with the resin layer against a sheet having a Danish walnut print and a resin content of 48 percent. The base substrate was provided by a ¾ in. flake board. The foregoing were pressed together for about 6 minutes at about 285°F and about 200 psi pressure. A structurally sound laminate was obtained having an abrasion resistance of about 250 cycles and outstanding chemical resistance.

EXAMPLE 2

A laminated product was made according to Example 1 except a resin thickness of 5½ to 9 mils was used. The resulting product had an abrasion resistance of between 550 to 900 cycles and good chemical resistance with the exception of slight staining by 100 percent reagent grade nitric acid.

EXAMPLE 3

A polyester resin containing 49 percent styrene and 51 percent isophthalic resin and a photopolymerization initiator and having a specific gravity of 1.08 and a viscosity of 300 centipoises was contacted with ultraviolet light at 8½ fpm, the resin was considered sufficiently cured to be used in the invention as described herein.

EXAMPLE 4

An aluminum texturing sheet was coated with a layer of substantially completely reactive polyester resin and vinyl monomer to a thickness of 0.010 ins. This sheet was then subjected to gamma radiation from a 300 kilovolt source operating in the range from 2.8 to 2.85 milliamps and utilizing a 48 in. scan at 0.09 megarads. The sheet with the resin was moved during the time it was subjected to the foregoing radiation cure at a speed of 8½ fpm. The foregoing technique resulted in a partial cure of the resin to a point where the resin was semisolid and dimensionally stable.

EXAMPLE 5

A liquid resin mixture was prepared containing an isophthalic polyester resin system having 66–68 percent polyester resin and 32—34 percent styrene monomer. About 1 percent "Triganol" ultraviolet sensitizer was added to produce a resin having a viscosity of 1100–1400 cps. The resin was applied with a reverse roll coating apparatus as a film about 5 mil thick on a continuously moving preimpregnated decorative sheet having a wood grain print. The film coated decorative sheet was then passed under an ultraviolet curing oven at the rate of 32 fpm. The curing oven contained two 250–300 watt ultraviolet Hanovia bulbs, which were 5 ft. long and spaced 2 ft. apart, at 1,750 volts and 7.5 amps. The bulbs were positioned about 8 inches above the resin film and this resulted in a partially cured dimensionally stable film. The decorative sheet and film move out of the oven through an optional forced-air cooling zone and then between two laminating rollers. A texturizing sheet is brought into contact with the film before entering the rollers and pressed into the resin layer as it passes therebetween.

The roller pressure is maintained at 25–100 lbs per lineal inch. The resulting intermediate product is collected into rolls for subsequent shipment to satellite pressing plants where the laminate is cut and hot pressed onto core materials as set forth in Example 1.

EXAMPLE 6

The process of Example 5 was carried out except that the decorative sheet was acrylic LSB (latex saturated base) paper supplied by Fitchburg Paper Co. This was coated with a 100 percent reactive liquid acrylic polymer mixture supplied by PPG. The liquid resin had a viscosity of 1100–1450 cps. and was chemically compatible with the acrylic LSB paper so that it formed a strong chemical bond therewith upon curing.

The foregoing specification has described the presently preferred embodiments of the invention and the best mode contemplated for the carrying out thereof. Reasonable variation and modification are possible within the invention, the scope of which is defined by the following claims:

We claim:

1. A method of making a laminated product comprising the steps of:
    a. impregnating a decorative sheet with a liquid thermosetting resin;
    b. drying said resin on said decorative sheet;
    c. coating said impregnated sheet on one side with a fluid radiation-curable resinous material consisting of 100 percent reactive solids;
    d. radiating said resinous material until it attains a dimensionally stable semisolid state;
    e. impressing a removable sheet upon said semisolid material with at least one pressure roller at about 5 to 150 pounds per linear inch;
    f. placing the side of said impregnated sheet opposite said semisolid material into contact with a substrate;
    g. applying heat and pressure to said impregnated sheet, removable sheet, semisolid material and substrate to cure said resin and semisolid material and bond said decorative sheet to said substrate; and,
    h. removing said removable sheet.

2. The method of claim 1 wherein step (a) includes the application of said thermosetting resin to both sides of said decorative sheet.

3. The method of claim 1 wherein said removable sheet is embossed and imparts a textured appearance to the surface of said resinous material.

4. The method of claim 1 wherein said resinous material comprises an acrylic resin and said thermosetting resin comprises an isophthalic resin and a solid monomer.

5. The method of claim 4 wherein said solid monomer is diacetone acrylamide.

6. The method of claim 1 wherein said resinous material comprises a polyester resin and vinyl monomer.

7. The method of claim 6 wherein said polyester resin is an isophthalic resin and said vinyl monomer is styrene.

8. The method of claim 1 including the step of applying a release agent to said removable sheet before impressing it upon said semisolid material.

* * * * *